UNITED STATES PATENT OFFICE.

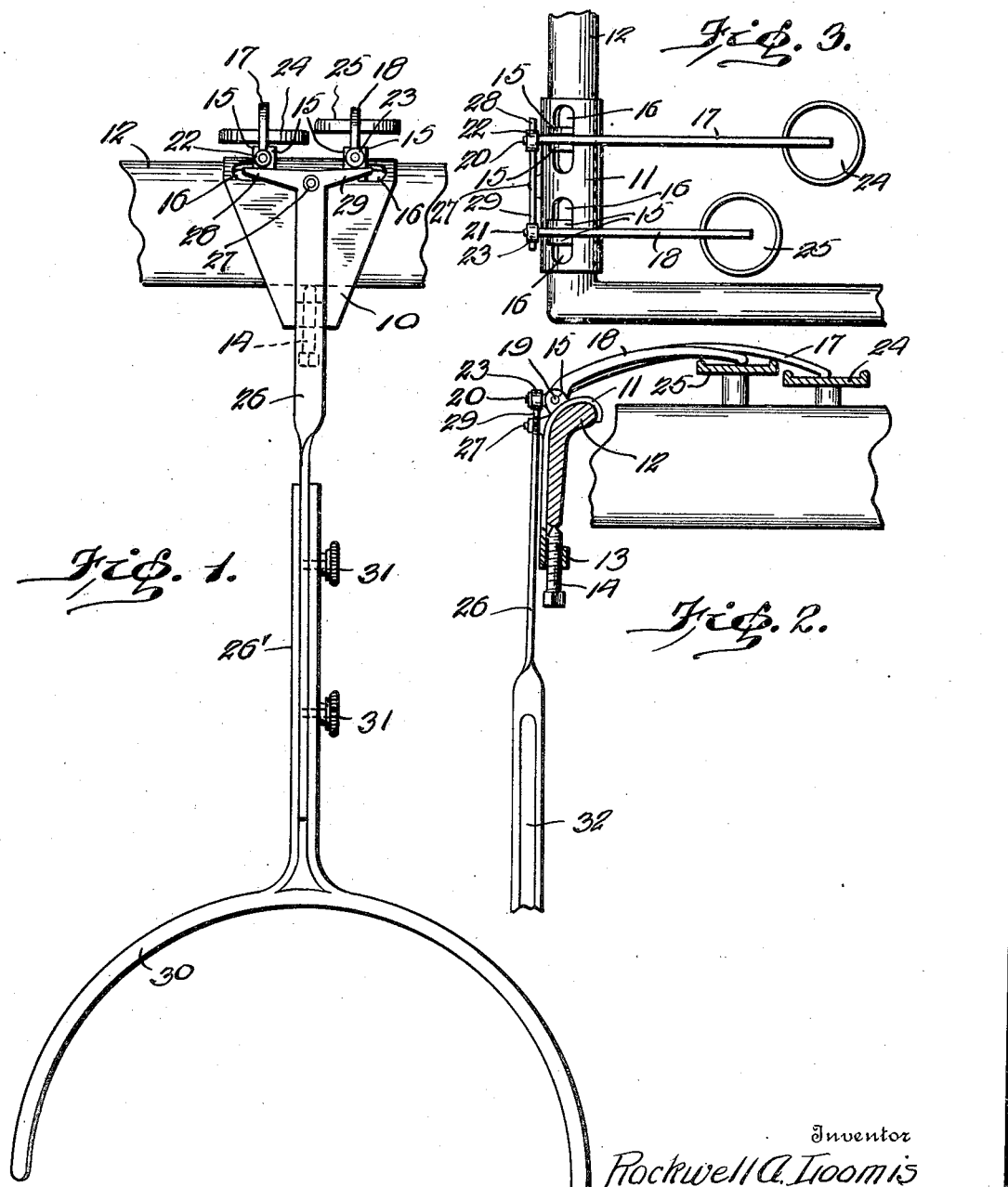

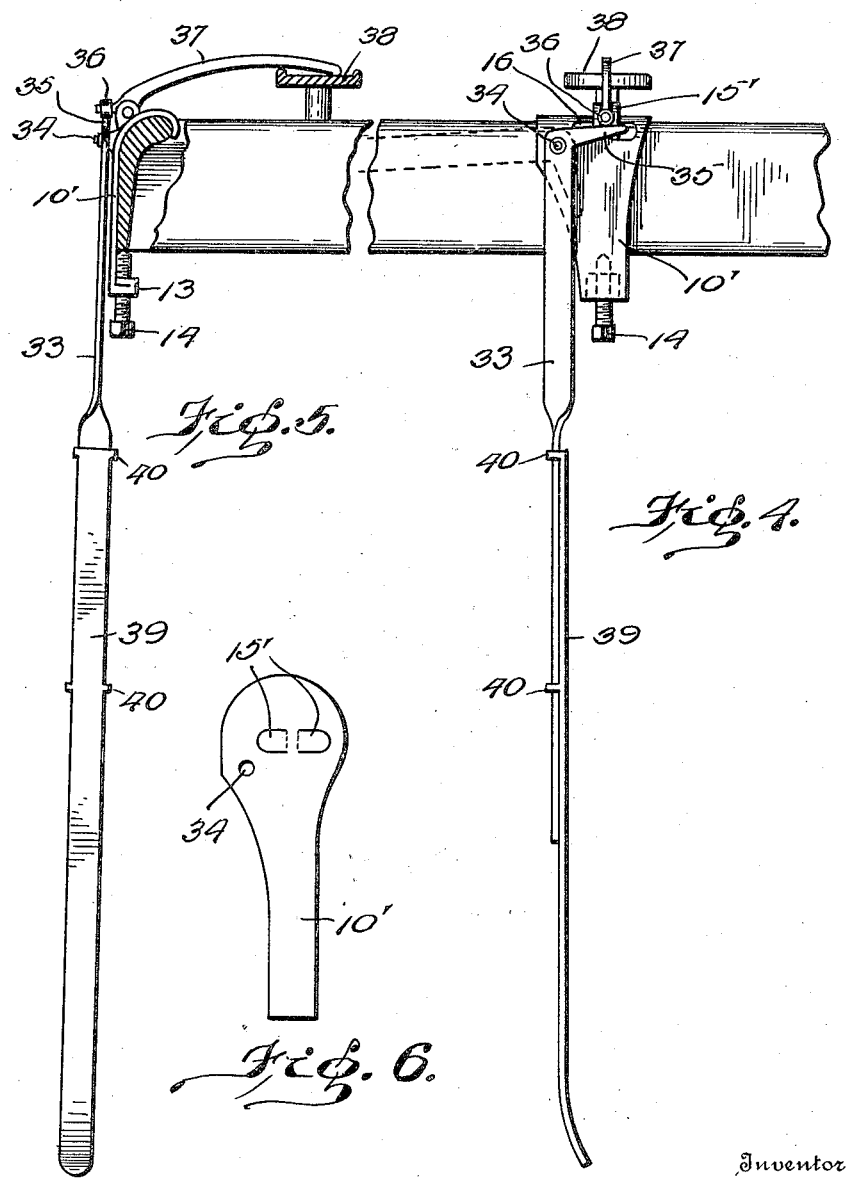

ROCKWELL A. LOOMIS, OF GUATEMALA, GUATEMALA.

CARRIAGE-SHIFTING MECHANISM FOR TYPEWRITERS.

1,423,443.  Specification of Letters Patent.  Patented July 18, 1922.

Application filed November 7, 1921. Serial No. 513,463.

*To all whom it may concern:*

Be it known that I, ROCKWELL A. LOOMIS, a citizen of the United States, residing at Guatemala city, Guatemala, in Central America, have invented certain new and useful Improvements in Carriage-Shifting Mechanisms for Typewriters, of which the following is a specification, reference being had therein to the accompanying drawings.

This invention relates to carriage shifting mechanisms for typewriters and has for an object to provide an improved mechanism for attaching to the frame of a typewriter whereby a swinging movement of the knee of the operator will result in operating the shift key of the machine.

A further object of the invention is to provide improved means for connection with the frame of a typewriter embodying a plurality of shift keys, and comprising means whereby the movement of the knee of the operator is translated through the mechanism employed to shift either of the shift keys as occasion may require.

With these and other objects in view the invention comprises certain novel units, parts, elements, constructions, combinations, mechanical movements and functions as disclosed in the drawings, together with mechanical equivalents thereof, as will be hereinafter more fully described and claimed.

In the drawings:

Figure 1 is a view of the invention in front elevation;

Figure 2 is a view of the invention in edge elevation showing parts of the typewriter frame in section;

Figure 3 is a view of the invention in top plan;

Figure 4 is a view in front elevation of a modified form of the invention embodying a single shift key;

Figure 5 is a view of a modified type of the invention in edge elevation, and

Figure 6 is a view of the blank from which the clip is constructed to attach to the typewriter frame.

Like characters of reference indicate corresponding parts throughout the several views.

In co-pending application Serial Number 459,652, filed April 8, 1921, now Patent #1,413,342, dated April 18, 1922, a means for shifting the carriage of a typewriter by the lateral movement of the knee of the operator is disclosed. The present invention is an improvement upon and carrying forward of that invention by simplifying the construction and operation of the device and also adapting it for use with a typewriter embodying a double shift carriage. In regard to the latter-mentioned structure a plate 10 is employed having a flange or hook 11 proportioned to hook over the top edge of the frame of a typewriter indicated conventionally at 12. The lower end of this plate 11 is bent inwardly and preferably backwardly upon itself as at 13, to produce the proper seating for the screw 14 which extends in parallelism with the plate 10 and engages the lower edge of the frame 12. In this manner the plate 10 and such structure as may be connected therewith is secured rigidly and firmly to the typewriter frame.

Upon this member composed of the plate 10 fulcrums are provided preferably in the form of ears 15, also preferably, though not necessarily, struck up from the metal, as indicated by the openings 16 from which such ears have been struck up.

Between the ears 15, produced in such or any convenient manner, levers 17 and 18 are fulcrumed, as at 19 and extended at 20 and 21 respectively to journal rollers 22 and 23. The lengths and shape of the levers 17 and 18 will be such as to properly engage the shift keys found upon a typewriter of the double-shift carriage type and indicated conventionally at 24 and 25, it being understood, of course, that the position of the keys as shown in the drawings is no limitation upon the present invention and that the device will correspond to and co-act with typewriters of different and various makes and properly arranged to engage shift keys variously and differently positioned.

To the front of the plate 10 a lever 26 is pivoted at 27 and provided with a T-head including the laterally extending arms 28 and 29 engaging beneath the rollers 22 and 23. As the lever 26 is swung in either direction upon its fulcrum 27, therefore, it is obvious that the arm 28 or 29 correspondingly will be raised, raising the engaging roller 22 or 23 and thereby depressing the levers 17 or 18. For the purpose of swinging this lever 26 in either direction an arcuate saddle 30 is provided proportioned to fit over the knee of the operator so that the movement of the knee laterally in either direction will effect the depressing of either the key 24 or 25 as the shifting requirements of the machine may make necessary.

So that the device may be used by operators of different stature or with tables of different heights, the lever 26 is made adjustable longitudinally by means of the screws 31 engaging through a slot 32 in the lever 26 and binding the section 26' firmly thereto.

For the construction of the device for a single shift type of machine a plate 10' is provided with but a single pair of ears 15', being otherwise identical with the plate shown at Figures 1 to 3 inclusive.

The operating lever 33 is fulcrumed to this plate 10' at 34 and is provided with a single lateral arm 35 bearing under the roller 36 of the lever 37 which bears upon the single shift key 38.

The length of the lever 33 is also made adjustable by means of the sliding section 39 with loops and keepers 40 for maintaining the adjusted relation.

It is obvious that by a movement of the lever in the direction indicated by the arrow at Figure 4, the roller 36 will be lifted, depressing the lever 37 and the key 38 in the manner hereinbefore described.

It is believed that the operation of the device will be fully and clearly understood from the foregoing description.

What I claim is:

1. The combination with a typewriter of a lever pivoted thereto and depending therefrom and levers pivoted to the frame and extending over the typewriter mechanism and adapted to be depressed selectively by movements of the first-mentioned lever in opposite directions.

2. The combination with a typewriter embodying two shift keys, of shift levers pivoted to the typewriter and extending over and bearing upon the keys, an operating lever pivoted to and depending from the typewriter, and connecting means whereby movements of the operating lever in opposite directions are translated into selective depressions of the first-mentioned levers.

3. The combination with a typewriter embodying two shift keys, of shift levers pivoted to the margin of the typewriter and extending over and bearing upon the shift keys and extending outwardly from the pivot opposite the engagement with the keys, an operating lever pivoted to the typewriter and depending therefrom, and a T-head carried by the operating lever proportioned to engage under the extending ends of the shift levers as the operating lever is swung in opposite directions.

4. The combination with a typewriter embodying two shift keys, of a fulcruming member rigidly secured to the margin of the typewriter, shift levers fulcrumed upon the fulcruming member and extending in one direction over and bearing upon the shift keys and at their opposite ends terminating in contiguous rollers, an operating lever pivoted to the fulcruming member and extending beneath the typewriter, and a T-head carried by the operating lever positioned to engage selectively under the rollers to lift said rollers and depress the opposite ends of said shift levers.

5. The combination with a typewriter embodying a frame and a shift mechanism, of a plate having a hooked upper end proportioned to hook over the frame of a typewriter, clamping mechanism carried at the lower end of the plate adapted to engage beneath the frame and clamp the plate firmly in position thereon, ears upstanding from the plate, a shift lever fulcrumed between the ears and extending over the frame into position to operate the shift mechanism, a lever pivoted to the front of the plate and extending below the typewriter, and a lateral offset carried by the operating lever in position to engage and operate the shift lever.

In testimony whereof I hereunto affix my signature in presence of two witnesses.

ROCKWELL A. LOOMIS.

Witnesses:
HENRY T. DWYER,
RAFAEL UBIEO, Sr.